US012601454B1

(12) United States Patent
Wei

(10) Patent No.: US 12,601,454 B1
(45) Date of Patent: Apr. 14, 2026

(54) SOLAR-POWERED WATERPROOF DECORATIVE LAMP

(71) Applicant: Yukun Wei, Sichuan (CN)

(72) Inventor: Yukun Wei, Sichuan (CN)

( * ) Notice: Subject to any disclaimer, the term of this patent is extended or adjusted under 35 U.S.C. 154(b) by 0 days.

(21) Appl. No.: 19/358,567

(22) Filed: Oct. 15, 2025

(51) Int. Cl.

| | |
|---|---|
| ***F21S 9/03*** | (2006.01) |
| ***F21V 5/00*** | (2018.01) |
| ***F21V 23/00*** | (2015.01) |
| ***F21V 23/04*** | (2006.01) |
| ***F21V 31/00*** | (2006.01) |
| *F21Y 115/10* | (2016.01) |

(52) U.S. Cl.

CPC .............. *F21S 9/037* (2013.01); *F21V 5/002* (2013.01); *F21V 23/003* (2013.01); *F21V 23/0442* (2013.01); *F21V 31/005* (2013.01); *F21Y 2115/10* (2016.08)

(58) Field of Classification Search

CPC .... F21S 9/03; F21S 9/032; F21S 9/035; F21S 9/037; F21V 31/00; F21V 31/005; F21V 23/04; F21V 23/0407; F21V 23/0414; F21V 23/0421; F21V 23/0428; F21V 23/0435; F21V 23/0442; F21V 23/045; F21V 23/0457; F21V 23/0464; F21V 23/0471; F21V 23/0478; F21V 23/0485; F21V 23/0492; F21W 2131/10; F21W 2131/1005; F21W 2131/101; F21W 2131/103; F21W 2131/105; F21W 2131/107; F21W 2131/109; F21Y 2115/10

See application file for complete search history.

(56) References Cited

U.S. PATENT DOCUMENTS

| | | | | |
|---|---|---|---|---|
| 2005/0248285 A1* | 11/2005 | Richmond | ............. | F21S 10/04 315/149 |
| 2013/0208454 A1* | 8/2013 | Chen | ....................... | F21S 9/037 362/183 |

* cited by examiner

*Primary Examiner* — Robert J May

(74) *Attorney, Agent, or Firm* — Hawaii Patent Services; Nathaniel K. Fedde; Kenton N. Fedde

(57) ABSTRACT

The present disclosure relates to the technical field of lighting fixtures, specifically a solar-powered waterproof decorative lamp, comprising: a lower shell; an upper shell, joined with the lower shell; a sealing ring, arranged between the lower shell and the upper shell for sealing the lower shell and the upper shell; an electronic assembly, arranged between the lower shell and the upper shell for providing a light source and power supply for the decorative lamp; and a photovoltaic power generation assembly, installed on top of the upper shell for providing solar charging to the electronic assembly.

19 Claims, 12 Drawing Sheets

SOLAR-POWERED WATERPROOF DECORATIVE LAMP

TECHNICAL FIELD

The present disclosure relates to the technical field of lighting fixtures, particularly to a solar-powered waterproof decorative lamp.

BACKGROUND

Decorative lamps are commonly used for scene lighting, set decoration, and creating ambiance. Most current decorative lamp devices are fixed installations powered by buried wiring, making it impossible to change their positions as needed once installed. Portable decorative lamps for set decoration often rely on built-in standard batteries or rechargeable batteries, requiring frequent active charging, which is inconvenient and costly.

Additionally, existing decorative lamps typically emit light upward, which can be glaring to pedestrians at night and fails to achieve the desired ground illumination. Moreover, these lamps have a single purpose and cannot adapt to different scenarios, making it difficult to meet users' practical needs for versatile use.

SUMMARY

The present disclosure provides a solar-powered waterproof decorative lamp to address the issues raised in the background above.

To achieve the aforementioned object, the present disclosure adopts the following technical solutions:

A solar-powered waterproof decorative lamp comprises a lower shell; an upper shell joined with the lower shell; a sealing ring arranged between the lower shell and the upper shell for sealing the lower shell and the upper shell; an electronic assembly arranged between the lower shell and the upper shell for providing a light source and power supply for the decorative lamp; a photovoltaic power generation assembly installed on a top of the upper shell for providing solar charging to the electronic assembly; wherein the lower shell comprises a support plate and a transparent lamp cover, the support plate is configured to be assembled and fixed with the upper shell, and the transparent lamp cover is arranged in the middle of the support plate; and a protective sleeve arranged at a bottom of the transparent lamp cover, with a sensor probe installed inside the protective sleeve.

A solar-powered waterproof decorative lamp comprises a lower shell; an upper shell joined with the lower shell; a sealing ring arranged between the lower shell and the upper shell for sealing the lower shell and the upper shell; an electronic assembly arranged between the lower shell and upper shell for providing a light source and power supply for the decorative lamp; wherein the electronic assembly comprises a lithium battery and a light board, with multicolor LED lamp beads integrated at the center of a bottom of the light board; and the light board is further integrated with a light control circuit module for controlling color changes of the LED lamp beads and a charge-discharge control circuit module for controlling charging and discharging of the lithium battery; a photovoltaic power generation assembly installed on a top of the upper shell for providing solar charging to the electronic assembly; wherein the lower shell comprises a support plate and a transparent lamp cover, with the support plate configured to be fixed to the upper shell, and the transparent lamp cover positioned at the center of the support plate; and a protective sleeve arranged at a bottom of the transparent lamp cover, with a sensor probe installed inside the protective sleeve; wherein the transparent lamp cover is designed with an overall hemispherical structure, and an inner sidewall of the transparent lamp cover consists of a plurality of planes forming a polygonal concave structure for repeatedly refracting and scattering the light emitted by the LED lamp beads integrated at the bottom of the light board, thereby evenly distributing the light from the light board onto the transparent lamp cover.

A solar-powered waterproof decorative lamp comprises a shell, comprising a lower shell and an upper shell that are integrally formed; an electronic assembly arranged between the lower shell and the upper shell for providing a light source and power supply for the decorative lamp; a photovoltaic power generation assembly installed on a top of the upper shell for providing solar charging to the electronic assembly; wherein the lower shell comprises a support plate and a transparent lamp cover, the support plate is configured to be assembled and fixed with the upper shell, and the transparent lamp cover is arranged in the middle of the support plate; and a protective sleeve arranged at a bottom of the transparent lamp cover, with a sensor probe installed inside the protective sleeve.

The beneficial effects of the present disclosure compared to the prior art are as follows:

The present disclosure utilizes solar photovoltaic panels to self-charge during idle daytime hours for nighttime use, saving energy and being environmentally friendly. Additionally, unlike traditional decorative lamps, this lamp emits light from the bottom. During installation, the lower end of the bottom protective sleeve is inserted into a socket on the lamp holder or ground, keeping the lower shell at a certain height from the ground. The hemispherically designed transparent lamp cover, featuring an internal multi-faceted reflective lens structure, not only prevents glare when pedestrians approach at night but also, through its spherical light-emitting surface and multi-faceted lens diffuser design, ensures ample lighting in the surrounding environment centered around the decorative lamp.

The entire decorative lamp adopts a fully sealed design, providing excellent waterproofing. It can also be placed directly in a swimming pool as a floating pool lamp. Furthermore, with the connection holes designed on the side of the lamp, it can be hung using hooks during outdoor camping to provide illumination, making it suitable for various scenarios.

Additionally, the designed sensor probe and installed display unit can display real-time environmental temperature, humidity, and battery level data. The charging port is primarily used for traditional charging methods when sunlight is insufficient in winter. Compared to traditional portable decorative lamp designs, this device offers superior practicality and convenience.

BRIEF DESCRIPTION OF DRAWINGS

The drawings, which form part of this application, are included to provide a further understanding of the present disclosure. The illustrative embodiments and the descriptions thereof are intended to explain the present disclosure and do not constitute undue limitations. In the drawings.

Figure 1:
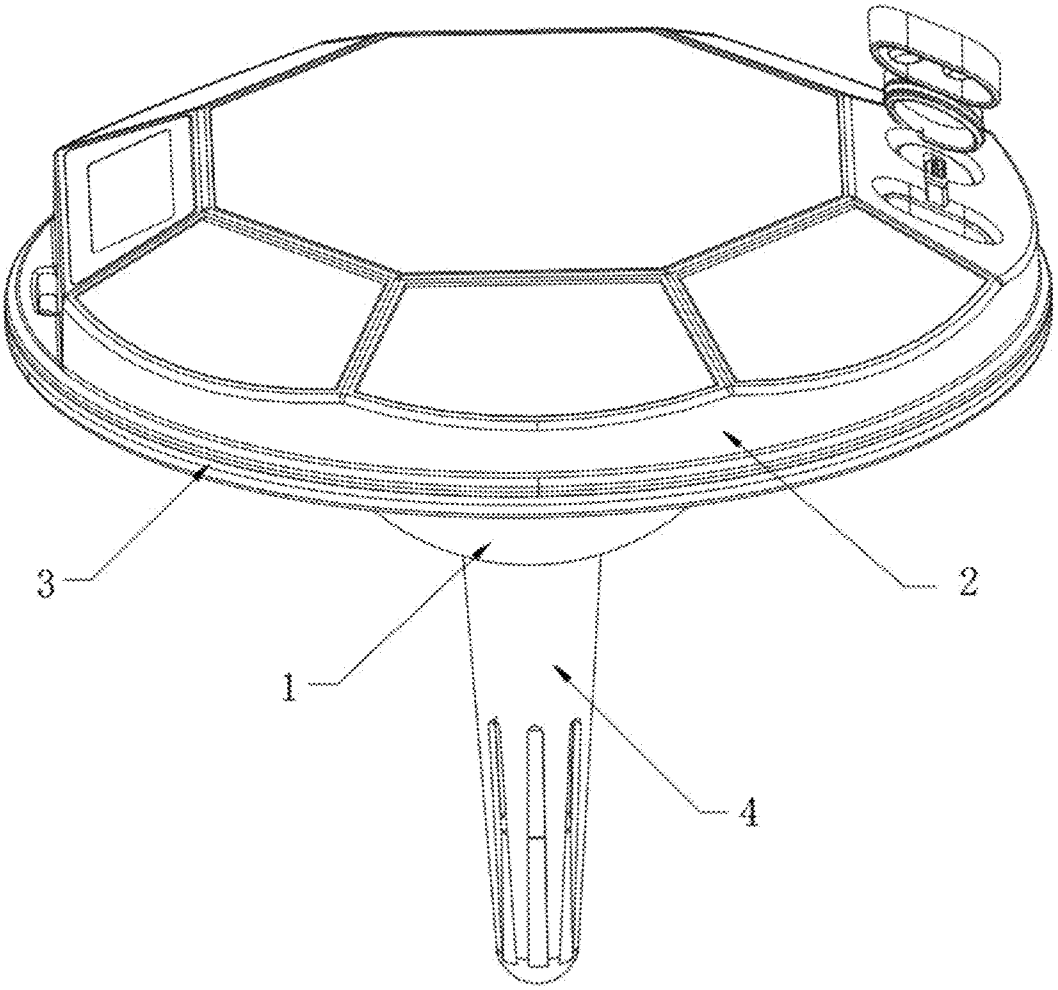
FIG. 1 is a schematic diagram of the overall structure of Embodiment 1 of the present disclosure.
Figure 2:
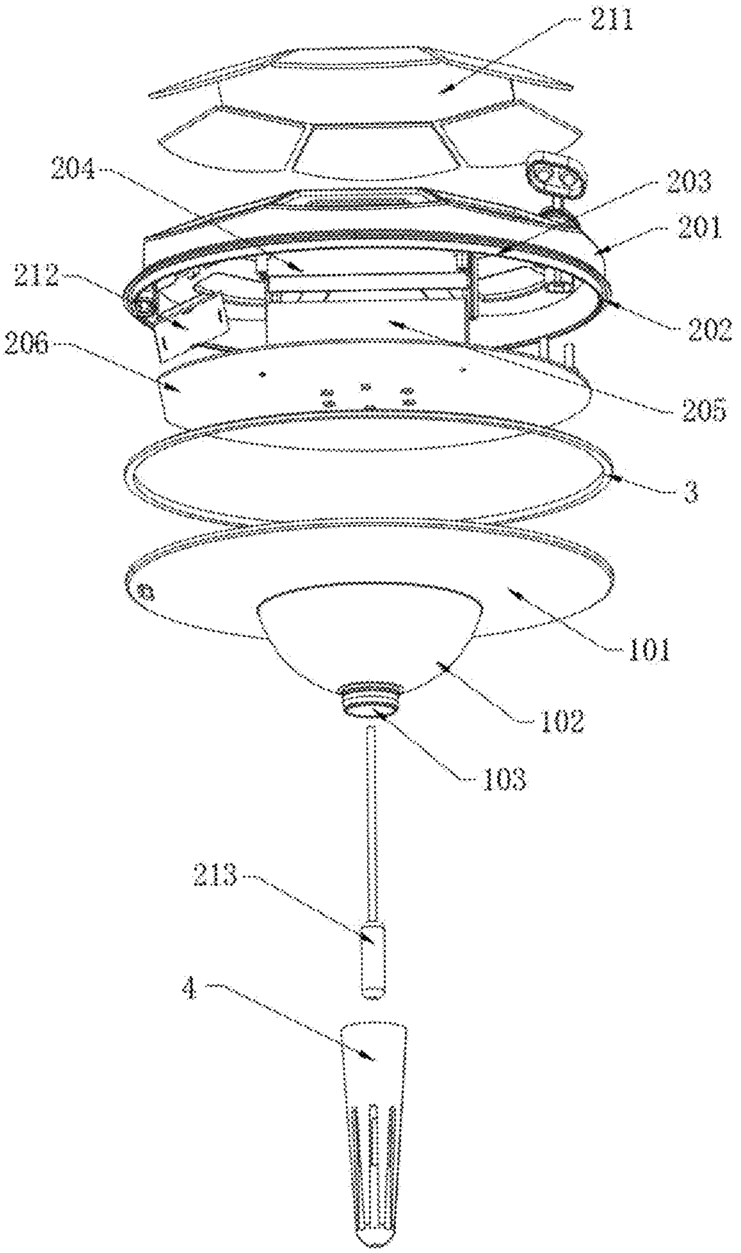
FIG. 2 is a first exploded structural schematic diagram of the present disclosure.
Figure 3:
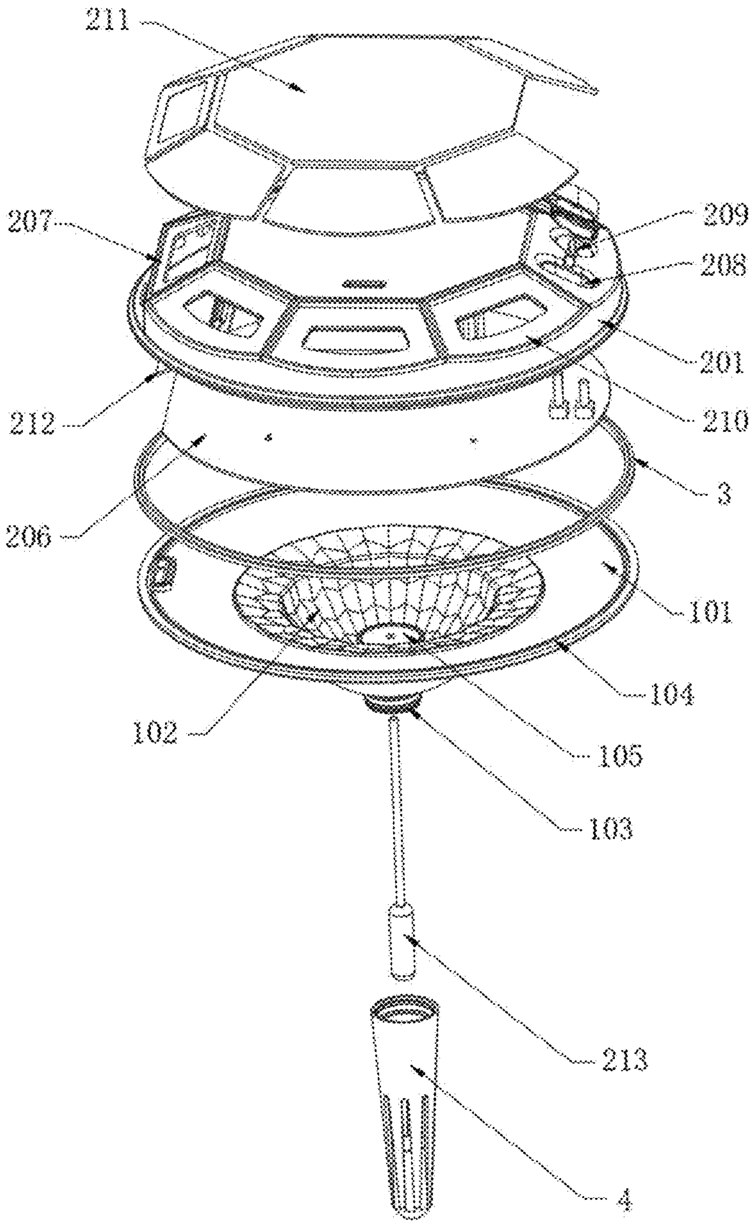
FIG. 3 is a second exploded structural schematic diagram of the present disclosure.
Figure 4:
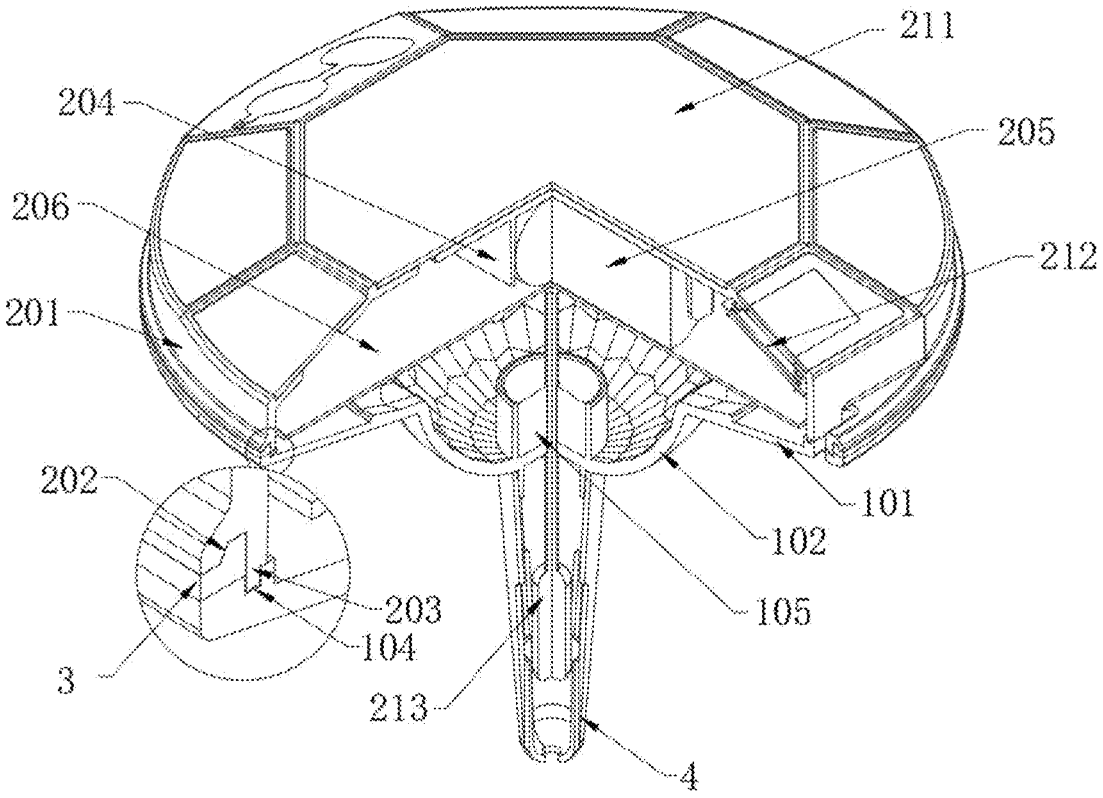
FIG. 4 is a semi-sectional structural schematic diagram of the present disclosure.

Reference signs: 1, Lower Shell; 101, Support Plate; 102, Transparent Lamp Cover; 103, Mounting Interface; 104, Slot; 105, Sealing Plug; 2, Upper Shell; 201, Shell Cover; 202, Wedge Slot; 203, Clamping Edge; 204, Battery Compartment; 205, Lithium Battery; 206, Light Board; 207, Display Mounting Groove; 208, Light Adjustment Button; 209, Charging Port; 210, Solar Panel Mounting Groove; 211, Solar Photovoltaic Panel; 212, LED Display; 213, Sensor Probe; 3, Sealing Ring; 4, Protective Sleeve; 5, Base; 501, Upper Seat; 502, Lower Seat; 503, Limiting Block; 504, Flange; 505, Limiting Groove; 506, First Through Hole; 507, Second Through Hole; 508, Limiting Hole; 509, Limiting Recess; 6, Adjuster; 601, Third Through Hole; 602, Buckle; 603, Bump; 604, Fourth Through Hole; 7, Fixing Mechanism; 701, Limiting Strip; 702, Connecting Plate; 703, Hollow Square-shaped Magnet.

DESCRIPTION OF EMBODIMENTS

The technical solution in the embodiment of the present disclosure will be clearly and completely described below with reference to the drawings. Obviously, the described embodiment is part of, rather than all of the embodiments of the present disclosure. The following description of at least one exemplary embodiment is illustrative in nature and is in no way intended to limit the present disclosure, its application or uses. Based on the embodiments in the present disclosure, all other embodiments obtained by those skilled in the art without creative work belong to the scope of protection of the present disclosure.

It should be noted that the terminology used here is only for describing specific embodiments, and is not intended to limit exemplary embodiments according to the present application. As used herein, the singular form is also intended to include the plural form unless the context clearly indicates otherwise. Furthermore, it should be appreciated that when the terms "comprising" and/or "including" are used in this specification, they specify the presence of features, steps, operations, devices, components and/or combinations thereof.

Unless otherwise specified, the relative arrangement of components and steps, numerical expressions and numerical values set forth in these embodiments do not limit the scope of the present disclosure. At the same time, it should be appreciated that for the convenience of description, the dimensions of various parts shown in the drawings are not drawn according to the actual scale relationship. Techniques, methods and equipment known to those skilled in the art may not be discussed in detail, but in appropriate cases, they should be regarded as part of the authorization specification. In all the examples shown and discussed herein, any specific values should be interpreted as illustrative, and not as limiting. Therefore, other examples of exemplary embodiments may have different values. It should be noted that similar numbers and letters indicate similar items in the following drawings, therefore once an item is defined in one drawing, it does not need to be further discussed in subsequent drawings.

In the description of the present disclosure, it should be understood that directional terms such as "front," "rear," "up," "down," "left," "right," "horizontal," "vertical," "perpendicular," "horizontal," and "top," "bottom," etc., generally refer to the orientation or positional relationship shown in the drawings. These terms are used solely for ease of describing the present disclosure and simplifying the description. Unless stated otherwise, these directional terms do not imply or require that the device or component referred to must have a specific orientation or be constructed and operated in a specific orientation, and thus should not be construed as limiting the scope of the present disclosure. The terms "inner" and "outer" refer to the inside and outside relative to the contour of the respective components themselves.

For ease of description, spatially relative terms such as "on," "above," "upper surface," or "over" may be used here to describe the spatial relationship between one device or feature and another device or feature as illustrated in the drawings. It should be understood that spatially relative terms are intended to encompass different orientations of the device in use or operation beyond the orientation depicted in the drawings. For example, if a device in the drawing is inverted, an element described as "above other devices or structures" or "over other devices or structures" would then be oriented as "below other devices or structures" or "under other devices or structures." Thus, the exemplary term "above" can include both "above" and "below" orientations. The device may also be positioned in other ways (rotated 90 degrees or in other orientations), and the spatially relative descriptions used here should be interpreted accordingly.

Furthermore, it should be noted that the use of terms such as "first" and "second" to define components is solely for the purpose of distinguishing between them. Unless otherwise stated, these terms carry no special meaning and should not be construed as limiting the scope of the present disclosure.

Embodiment 1

To address issues such as inconvenience in use, high costs, limited effects, and the inability to meet users' practical needs for multi-purpose applications in currently known decorative lamp designs, we propose a solar-powered waterproof decorative lamp. The specific solution is as follows:

As shown in FIGS. 1 to 4, this embodiment provides a solar-powered waterproof decorative lamp, which includes a lower shell 1 and an upper shell 2. After the lower shell 1 and upper shell 2 are snap-fitted together, the gap between them is sealed with a sealing ring 3 to ensure waterproof and airtight properties between the lower shell 1 and upper shell 2.

In other embodiments (not shown), the lower shell 1 and upper shell 2 are integrally formed into a single housing, which eliminates the need for a sealing ring 3 and offers high waterproof performance.

Between the upper shell 2 and lower shell 1, there is an electronic assembly primarily used to provide the decorative lamp with a light source and power supply. The electronic assembly mainly consists of a lithium battery 205, a light board 206 and an LED display 212. The middle of the bottom of the light board 206 is integrated with LED lamp beads, serving as the illumination light source for the entire decorative lamp. The light board 206 is further integrated with a charge-discharge control circuit module to manage the lithium battery 205's charging and discharging. The lithium battery 205 is electrically connected to the charge-discharge control circuit module, which employs a conventional battery management system module. The lithium battery 205 primarily powers the light board 206 and LED display 212.

To achieve energy-saving effects and enable autonomous photovoltaic power generation during idle daytime hours, a photovoltaic power generation assembly is installed at the top of the upper shell 2 to provide solar charging for the electronic assembly. The photovoltaic power generation assembly consists of several solar photovoltaic panels 211 and a junction box electrically connected to all the solar photovoltaic panels 211. The junction box is installed inside the upper shell 2 and electrically connected to the charge-discharge control circuit module on the light board 206. The junction box adopts a commonly used solar junction box device in the photovoltaic power generation field, serving as a connection hub between the photovoltaic components and the charging control device. It draws out the direct current generated by the solar photovoltaic panels 211, ensuring power transmission to the energy storage unit while also maintaining the stability and reliability of the entire photovoltaic power generation system.

To enable bottom illumination for the decorative lamp, the lower shell 1 includes a support plate 101 for assembly and fixation with the upper shell 2, as well as a transparent lamp cover 102 positioned at the center of the support plate 101. The bottom of the transparent lamp cover 102 is equipped with a protective sleeve 4 to safeguard the sensor probe 213 installed inside it. The transparent lamp cover 102 features a hemispherical design, with its inner wall composed of a plurality of flat surfaces forming a polygonal concave structure. This structure refracts and scatters the light emitted by the LED lamp beads integrated at the bottom of the light board 206, ensuring uniform light distribution across the transparent lamp cover 102.

During installation, the lower end of the bottom protective sleeve 4 is inserted into a socket on the lamp base (not shown) or a ground-mounted socket, keeping the lower shell 1 at a certain height from the ground. The hemispherical transparent lamp cover 102, featuring an internal multi-faceted reflective lens structure, not only prevents glare when pedestrians approach at night but also ensures ample lighting in the surrounding environment centered around the decorative lamp, thanks to its spherical light-emitting surface and multi-faceted lens diffuser design.

To enhance the adaptability of the decorative lamp to environmental and ambiance requirements during use, enabling it to adjust the lighting color to suit different scenarios, the LED lamp beads integrated in the middle of the light board 206 employ conventional multi-color LED lamp beads. Additionally, the light board 206 includes a light control circuit module to manage color changes in the LED lamp beads. It should be noted that the multi-color LED lamp beads can be either tri-color or seven-color variants based on needs, while the light control circuit module utilizes a standard RGB-LED driver control module, allowing the decorative lamp to achieve diverse lighting effects.

To facilitate the installation of various components, the upper shell 2 primarily consists of a shell cover 201 fixed to the support plate 101 at the bottom. The top of the shell cover 201 features a solar panel mounting groove 210 for mounting the photovoltaic power generation assembly and a display mounting groove 207 for the LED display 212. Inside the shell cover 201, there is also a battery compartment 204 to secure and install the lithium battery 205. One side of the shell cover 201 includes a charging port 209 and a light adjustment button 208, which are electrically connected to the charge-discharge control circuit module and the light control circuit module integrated on the light board 206. The charging port 209 and light adjustment button 208 are externally covered with a removable waterproof and dustproof silicone cover to prevent water ingress. Additionally, for user convenience in adjusting lighting at night, the light adjustment button 208 can adopt a commonly available self-illuminating variant, where its integrated miniature multi-color LED lamp beads synchronize with those on the light board 206 under the control of the light control circuit module.

The charging port 209 is designed primarily to charge the lithium battery 205 using traditional charging methods when insufficient sunlight (e.g., in winter) reduces the efficiency of solar photovoltaic power generation, thereby enhancing the device's practicality. The light adjustment button 208, on the other hand, is designed to allow users to easily adjust the color of the light emitted by the decorative lamp according to their needs.

To ensure the waterproof sealing effect of the entire device, several solar photovoltaic panels 211 are respectively installed in the corresponding solar panel mounting grooves 210, and the solar photovoltaic panels 211 and the solar panel mounting grooves 210 are secured and waterproof-sealed with a sealant. Meanwhile, the LED display 212 is installed in the display mounting groove 207, and the top of the display mounting groove 207 is fixed with a waterproof plexiglass protective plate using sealant.

To enable real-time display of the remaining power of the lithium battery 205 and the external environmental data detected by the sensor probe 213 on the LED display 212, the LED display 212 is also electrically connected to the sensor probe 213 and the charge-discharge control circuit module on the light board 206. This allows for real-time monitoring of the lithium battery 205's power level and the data detected by the sensor probe 213. The sensor probe 213 can be any of the following: a thermistor sensor probe 213, a capacitive humidity sensor, or an infrared temperature sensor, used to detect environmental temperature or humidity data. In this embodiment, the thermistor sensor probe 213 is preferred.

To facilitate the portability of the decorative lamp, a mounting interface 103 is provided at the center of the bottom of the transparent lamp cover 102 for mounting the protective sleeve 4. The protective sleeve 4 and the mounting interface 103 are detachably assembled. During transportation, to save space as much as possible, the protective sleeve 4 can be removed from the mounting interface 103 and reinstalled when the decorative lamp is in use.

To ensure the device's sealing without affecting the sensor probe 213's ability to collect environmental data, the sensor probe 213 extends from inside the lower shell 1 to the outside through the mounting interface 103. A sealing plug 105 is installed inside the mounting interface 103, wrapping around the wires of the sensor probe 213, providing waterproof closure without interfering with its normal operation.

To ensure the seal between the lower shell 1 and the upper shell 2, the inner side of the sealing ring 3 protrudes upward to form an annular boss, while its bottom fits against the outer edge of the support plate 101. A circular slot 104 is carved along the inner side of the sealing ring 3 at the top of the support plate 101. Correspondingly, the shell cover 201 of the upper shell 2 features a wedge slot 202 at the position matching the boss on the sealing ring 3. An annular clamping edge 203 that is engaged with the slot 104 is integrally molded inside the wedge slot 202. When the upper shell 2 and lower shell 1 are fastened, the boss on the sealing ring 3 fits into the wedge slot 202 at the bottom of the upper shell 2, while the clamping edge 203 at the bottom of the upper shell 2 tightly embeds into the slot 104 at the top of the lower shell 1.

To further expand the usage scenarios of the decorative lamp, both the lower shell 1 and the upper shell 2 are equipped with a connection hole on opposite sides at the same side. The lamp features a fully sealed design with excellent waterproofing, allowing it to be placed directly in a pool as a floating light. Additionally, the connection holes on the side enable outdoor camping use, where it can be hung with hooks for illumination, making it suitable for various applications.

To facilitate the sensor probe 213 in detecting environmental data, the middle section of the protective sleeve 4 adopts a hollow design, while its bottom is tapered for easy insertion of the decorative lamp into the ground.

Embodiment 2

Figure 5:
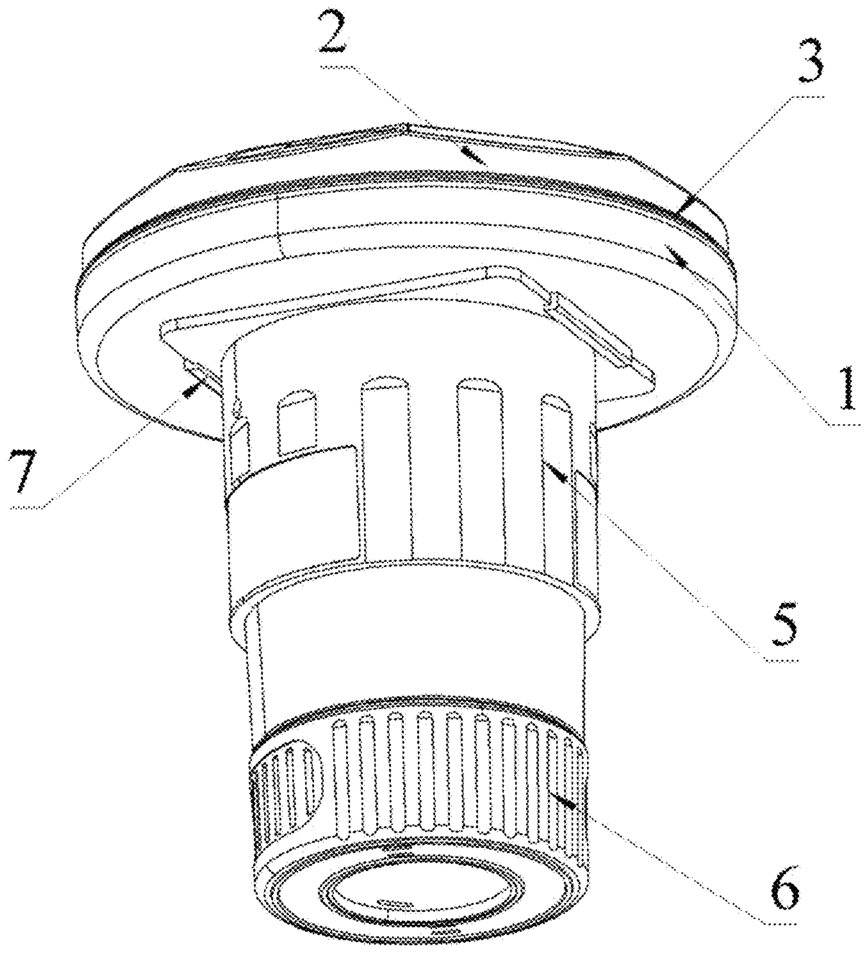
FIG. 5 is a schematic diagram of the overall structure of Embodiment 2 of the present disclosure.
Figure 6:
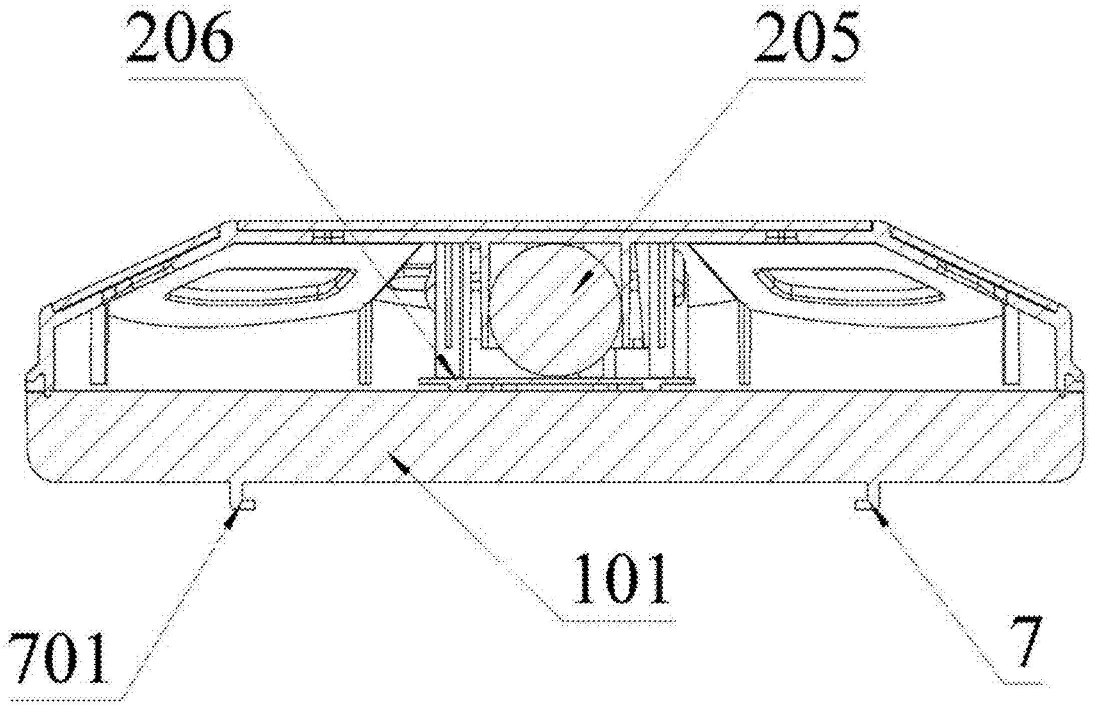
FIG. 6 is a schematic diagram of the support plate and fixing mechanism in FIG. 5.

As shown in FIGS. 5 and 6, the transparent lamp cover 102 and the protective sleeve 4 are omitted. A fixing mechanism 7 and a base 5 are installed at the bottom of the support plate 101. The support plate 101 and the base 5 are assembled and disassembled via the fixing mechanism 7. When purifying agents need to be placed inside the base 5, the support plate 101 and the base 5 are detached using the fixing mechanism 7. After placing the purifying agents inside the base 5, the support plate 101 and the base 5 are reassembled and fixed via the fixing mechanism 7, facilitating the use of decorative lights in water areas such as pools for water disinfection and purification. The base 5 is rotatably equipped with an adjuster 6. By rotating the adjuster 6, the water inflow into the base 5 can be adjusted, thereby controlling the dissolution rate of the purifying agents.

As shown in FIGS. 7 to 10, the base 5 consists of an upper seat 501 and a lower seat 502, which are slidably connected, allowing the height of the base 5 to be adjusted according to the depth of the pool. The top of the lower seat 502 protrudes outward with a flange 504, and a plurality of limiting grooves 505 are evenly spaced along the edge of the flange 504. The inner wall of the upper seat 501 is vertically equipped with limiting blocks 503 corresponding to the limiting grooves 505. The limiting grooves 505 and the limiting blocks 503 are interference-fitted, enabling the lower seat 502 to slide vertically inside the upper seat 501 through their engagement. The lower seat 502 contains a cavity for holding purifying agents, such as chlorine tablets, chlorine dioxide tablets, or hypochlorous acid disinfectant tablets, which are used to disinfect and sterilize pool water.

As shown in FIGS. 7 to 10, the inner bottom wall of the lower seat 502 is equipped with two second through holes 507 and two limiting holes 508. The two second through holes 507 are symmetrically arranged, allowing a small amount of water to enter the base 5, while the two limiting holes 508 are also symmetrically positioned. The inner wall of the lower seat 502 is further equipped with a plurality of evenly spaced first through holes 506, facilitating the entry of pool water into the lower seat 502. The inner bottom wall of the adjuster 6 is symmetrically fitted with two sets of buckles 602. By inserting the buckles 602 into the limiting holes 508, the adjuster 6 is mounted onto the lower seat 502, securing it in place and preventing separation. The buckles 602 can move within the limiting holes 508, allowing the adjuster 6 to rotate relative to the lower seat 502 and adjust the angle between them.

Figure 9:
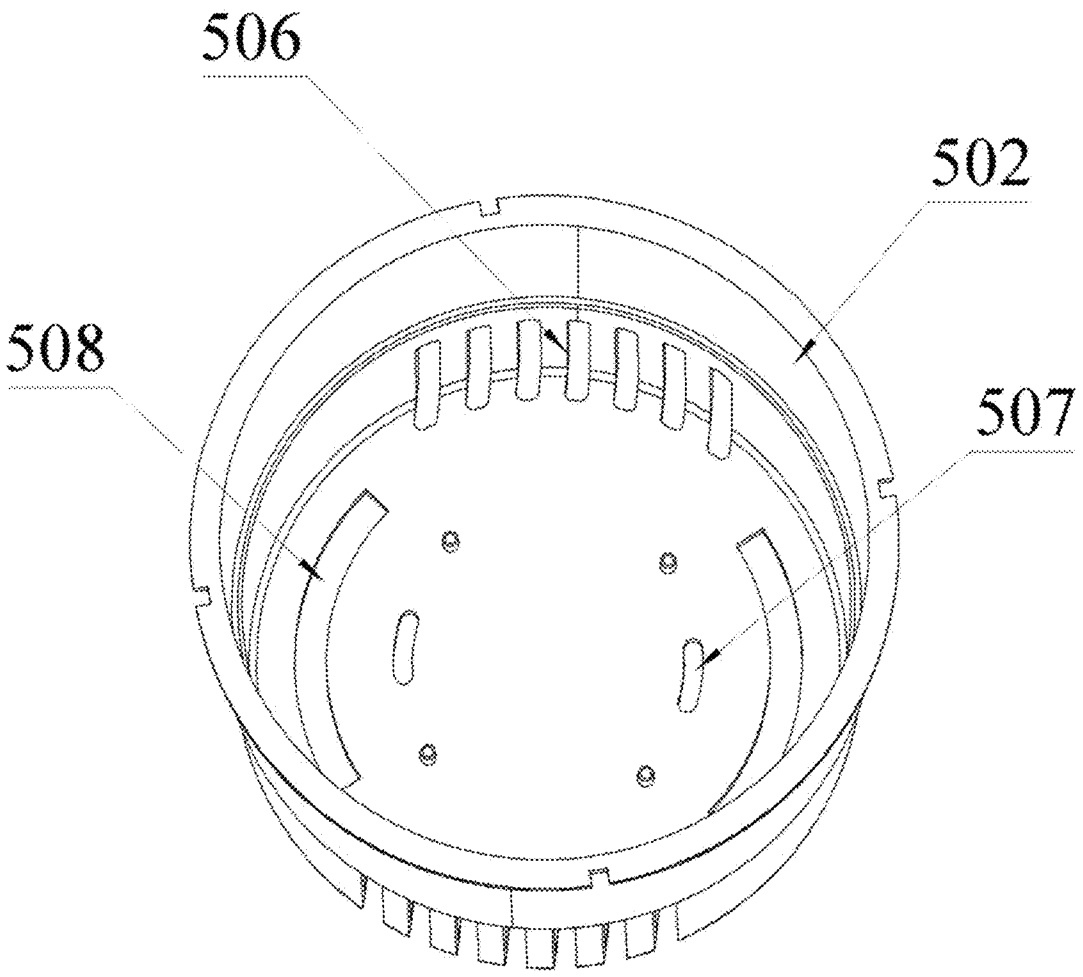
FIG. 9 is a schematic diagram of the internal structure of the lower seat in FIG. 8.
Figure 10:
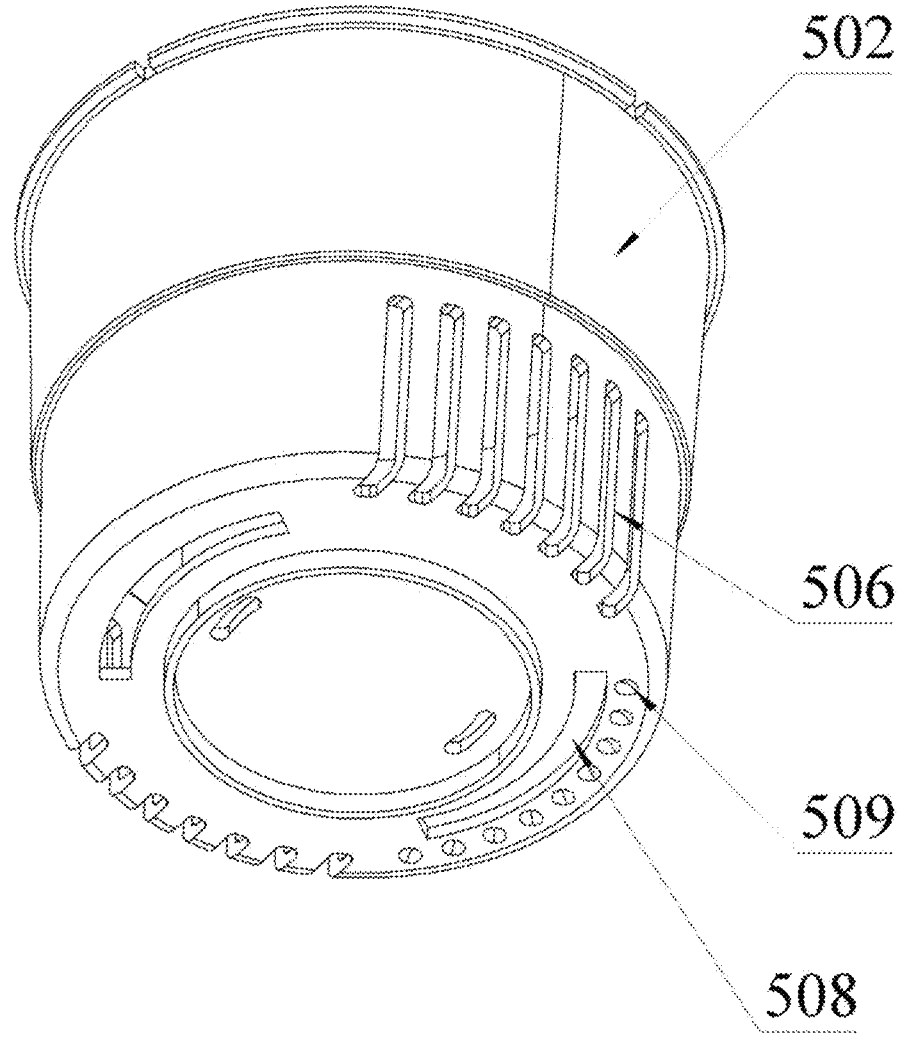
FIG. 10 is a schematic diagram of the bottom structure of the lower seat in FIG. 8.
Figure 11:
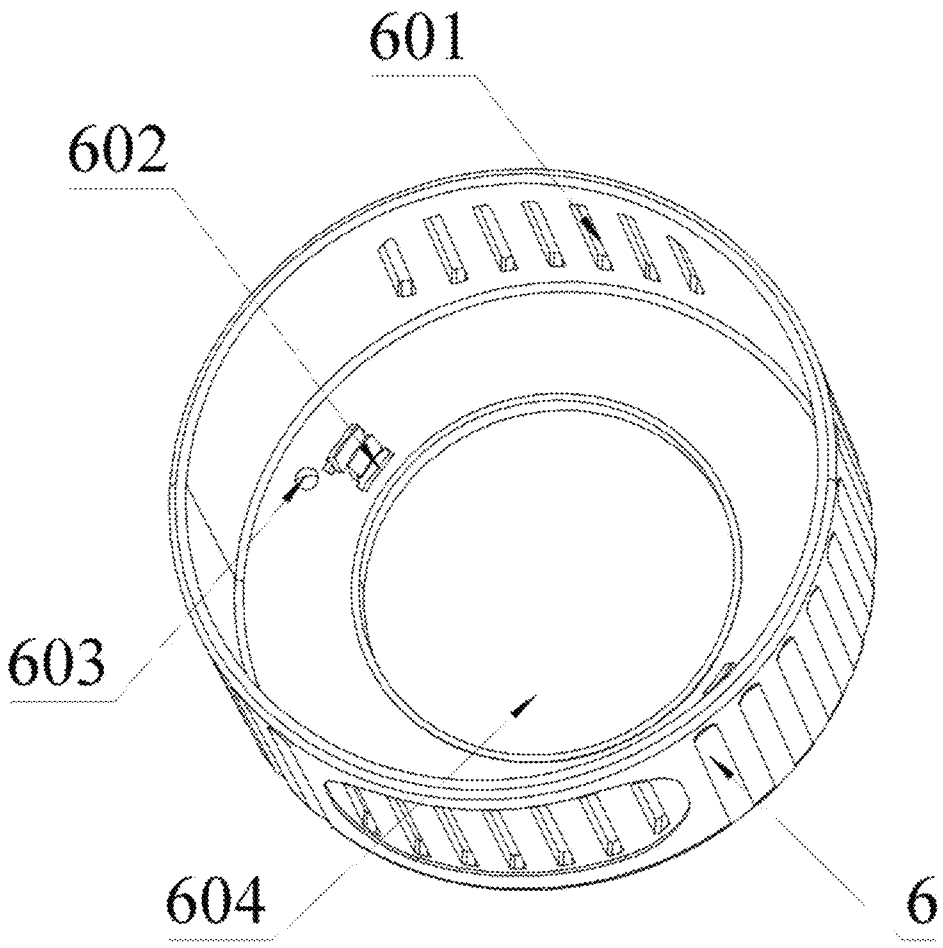
FIG. 11 is a schematic diagram of the internal structure of the adjuster in FIG. 7.

As shown in FIGS. 9 to 11, the inner wall of the adjuster 6 is provided with a plurality of third through holes 601 corresponding to the first through holes 506. Purification agents are placed inside the adjuster 6. By rotating the adjuster 6, the overlapping area between the first through holes 506 and the third through holes 601 is adjusted to control the water inflow, thereby regulating the purification rate of the pool water by the purification agents. The bottom of the adjuster 6 is also equipped with fourth through holes 604, which are connected to the second through holes 507. Pool water sequentially passes through the fourth through holes 604 and the second through holes 507 to enter the interior of the lower seat 502, further dissolving the purification agents.

The bottom of the lower seat 502 is provided with a plurality of evenly distributed limiting recesses 509. The inner bottom wall of the adjuster 6 also has a bump 603 corresponding in size to the limiting recesses 509, and the bump 603 is located inside a limiting recess 509. During the rotation of the adjuster 6, the bump 603 follows the adjuster 6's movement, shifting from one limiting recess 509 to another, providing a gear-like sensation during adjustment. When the adjuster 6 stops rotating, the bump 603 fully resides within a limiting recess 509, restricting the adjuster 6's movement and preventing it from rotating under external forces in the water, which could affect the dissolution rate of the purification agents.

Figure 7:
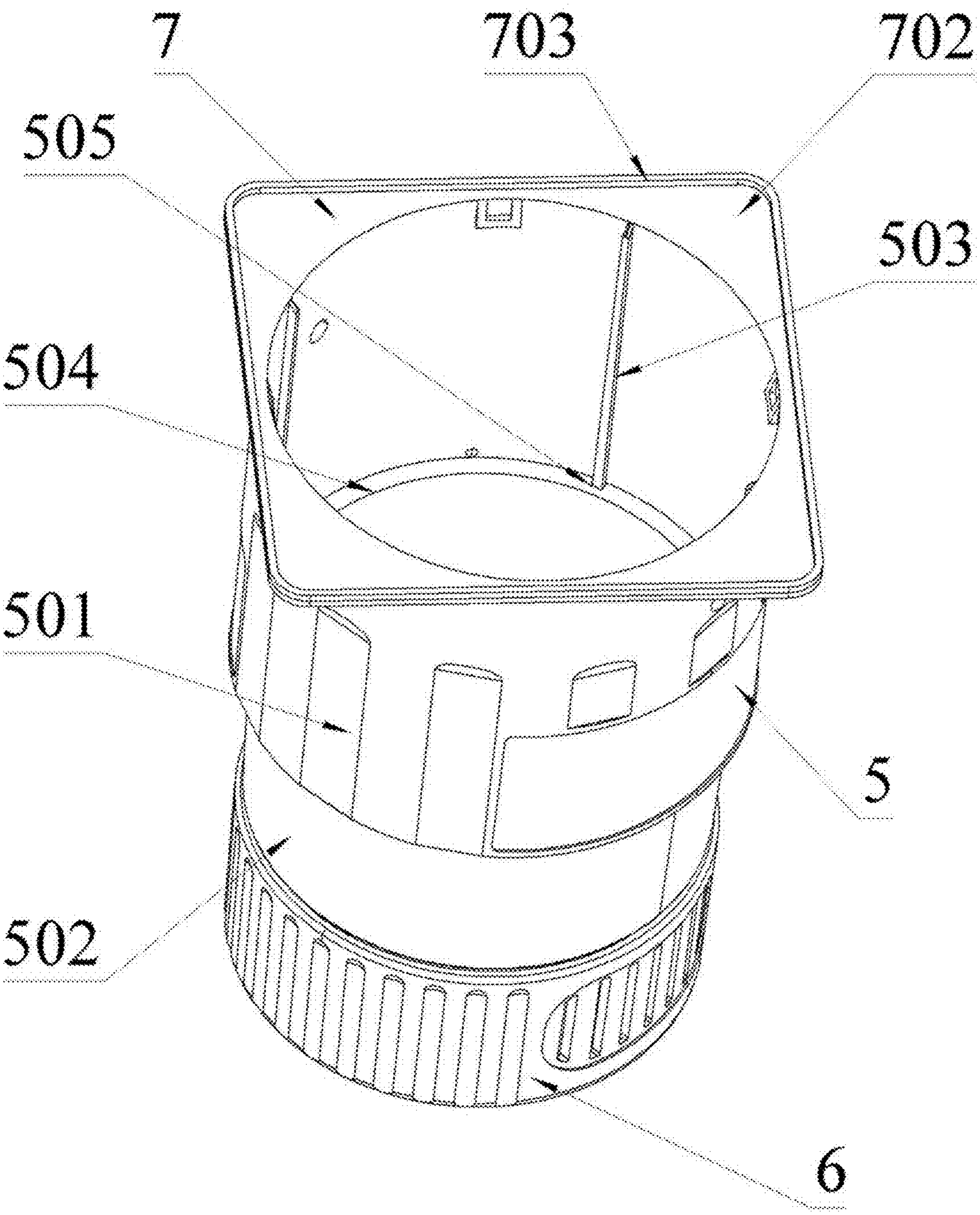
FIG. 7 is a schematic diagram of the base, adjuster, and fixing mechanism in FIG. 5.
Figure 8:
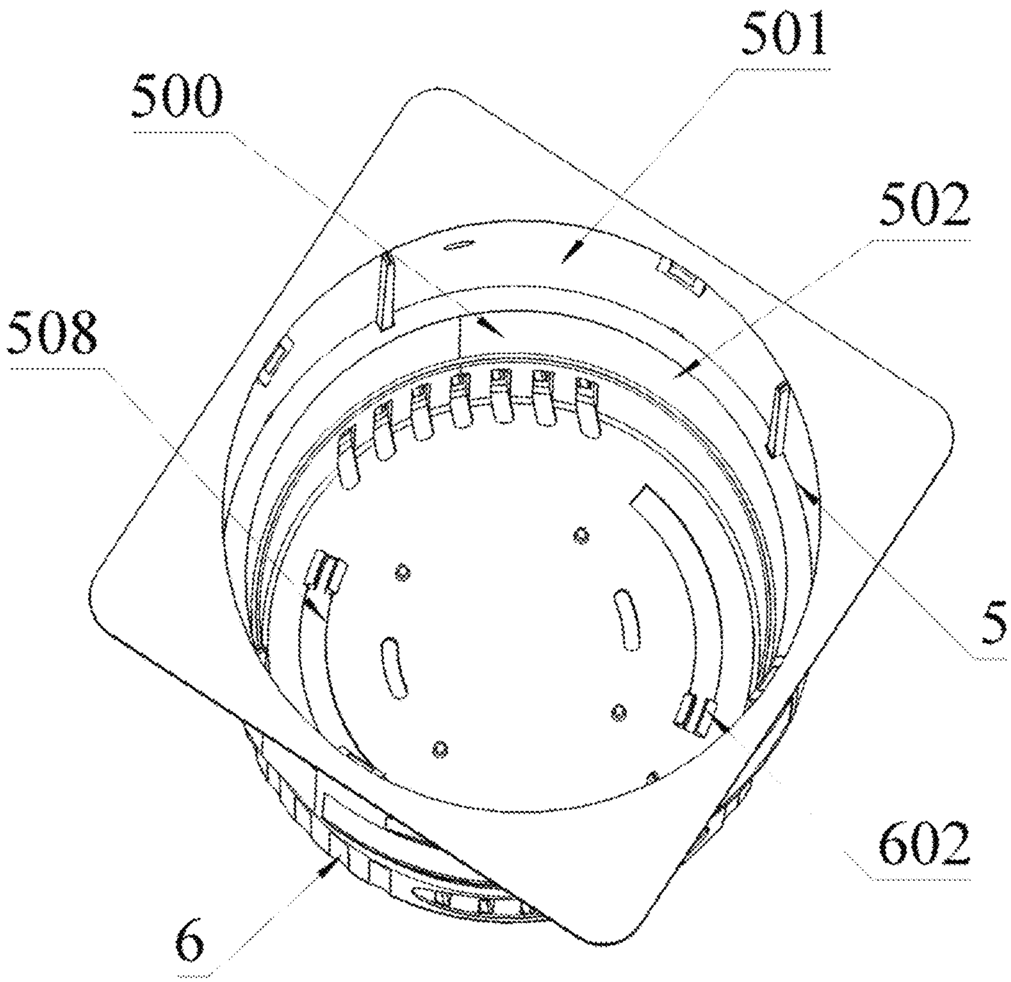
FIG. 8 is a schematic structural diagram of the base and adjuster in FIG. 7.
Figure 12:
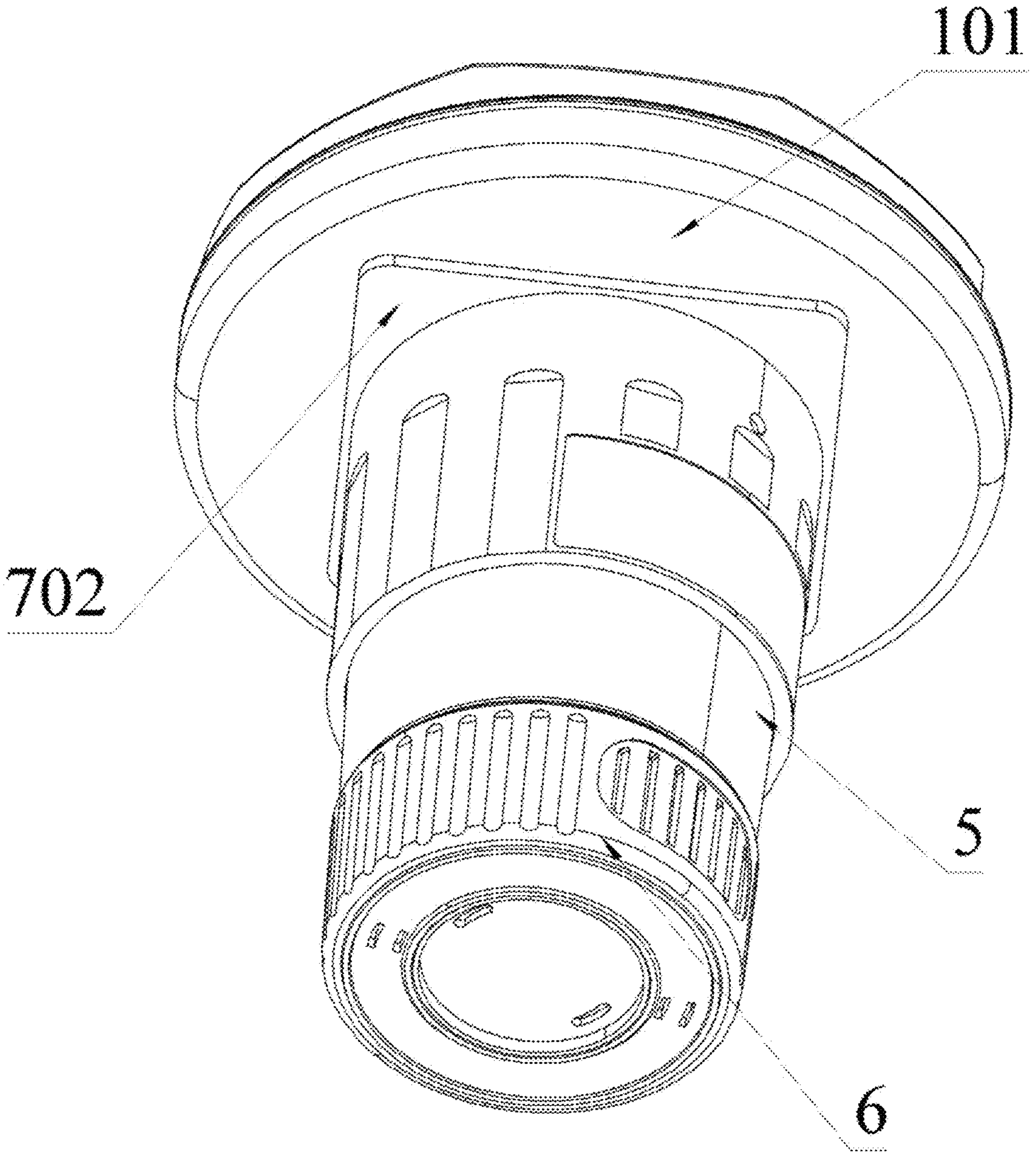
FIG. 12 is a bottom-view schematic structural diagram of FIG. 5.

As shown in FIGS. 6, 7, and 12, the fixing mechanism 7 includes a hollow square-shaped connecting plate 702 mounted on the top of the upper seat 501, as well as a hollow square-shaped magnet 703 installed at the bottom of the support plate 101 and two symmetrically arranged limiting strips 701. Both the hollow square-shaped magnet 703 and the connecting plate 702 have rounded edges. The limiting strips 701 are L-shaped, and the periphery of the connecting plate 702's top is equipped with circular slots containing disc-shaped magnets. These disc-shaped magnets and the hollow square-shaped magnet 703 have opposite magnetic polarities, causing them to be adsorbed to each other when in contact. To install the base 5 and the support plate 101, the connecting plate 702 is moved toward the hollow square-shaped magnet 703 until the hollow square-shaped magnet 703 abuts against the connecting plate 702. The connecting plate 702 is then pushed in the direction parallel to the limiting strips 701 until it fully aligns with the hollow square-shaped magnet 703, at which point the disc-shaped magnets and the hollow square-shaped magnet 703 are adsorbed to each other, and the connecting plate 702 is positioned within the limiting strips 701, securing the base 5. To disassemble the base 5, it is pushed to move the connecting plate 702. Once the connecting plate 702 moves away from the limiting strips 701, the base 5 can be removed, allowing new purification agents to be added.

The above descriptions are merely preferred embodiments of the present disclosure and are not intended to limit the present disclosure. For those skilled in the art, the present disclosure may have various modifications and changes. Any amendments, equivalent substitutions, improvements, etc., made within the spirit and principles of the present disclosure shall be included within the scope of protection of the present disclosure.

What is claimed is:

1. A solar-powered waterproof decorative lamp, comprising:

a lower shell;

an upper shell joined with the lower shell;

a sealing ring arranged between the lower shell and the upper shell for sealing the lower shell and the upper shell;

an electronic assembly arranged between the lower shell and the upper shell for providing a light source and power supply for the decorative lamp;

a photovoltaic power generation assembly installed on a top of the upper shell for providing solar charging to the electronic assembly;

wherein the lower shell comprises a support plate and a transparent lamp cover, the support plate is configured to be assembled and fixed with the upper shell, and the transparent lamp cover is arranged in the middle of the support plate; and a protective sleeve arranged at a bottom of the transparent lamp cover, with a sensor probe installed inside the protective sleeve.

2. The solar-powered waterproof decorative lamp according to claim 1, wherein the electronic assembly consists of a lithium battery, a light board and an LED display;

LED lamp beads integrated in the middle of a bottom of the light board are conventional multi-color LED lamp beads; and the light board is further integrated with a light control circuit module for controlling color changes of the LED lamp beads and a charge-discharge control circuit module for controlling charging and discharging of the lithium battery.

3. The solar-powered waterproof decorative lamp according to claim 2, wherein the upper shell comprises a shell cover with a bottom assembled and fixed with the support plate;

a top of the shell cover is provided with a solar panel mounting groove and a display mounting groove for mounting the photovoltaic power generation assembly and the LED display respectively; and the shell cover also houses a battery compartment for securing and mounting the lithium battery.

4. The solar-powered waterproof decorative lamp according to claim 2, wherein the LED display is installed in the display mounting groove and is also electrically connected to the sensor probe and the charge-discharge control circuit module on the light board for displaying a level of the lithium battery and data detected by the sensor probe in real time; and a waterproof plexiglass protective plate is fixed at a top of the display mounting groove with a sealant.

5. The solar-powered waterproof decorative lamp according to claim 1, wherein one side of the shell cover is further provided with a charging port and a light adjustment button electrically connected to the charge-discharge control circuit module and the light control circuit module integrated on the light board, and a removable waterproof and dustproof silicone cover is provided outside the charging port and the light adjustment button.

6. The solar-powered waterproof decorative lamp according to claim 1, wherein the photovoltaic power generation assembly comprises a plurality of solar photovoltaic panels that are respectively arranged in corresponding solar panel mounting grooves, and the solar photovoltaic panels and the solar panel mounting grooves are secured and waterproof-sealed with a sealant; and the photovoltaic power generation assembly further comprises a junction box electrically connected to all solar photovoltaic panels, and the junction box is installed inside the upper shell and electrically connected to the charge-discharge control circuit module on the light board.

7. The solar-powered waterproof decorative lamp according to claim 1, wherein the sensor probe adopts any one of a thermistor sensor probe, a capacitive humidity sensor, or an infrared temperature sensor.

8. The solar-powered waterproof decorative lamp according to claim 1, wherein the transparent lamp cover is designed with an overall hemispherical structure, and an inner sidewall of the transparent lamp cover consists of a plurality of planes forming a polygonal concave structure for repeatedly refracting and scattering the light emitted by the LED lamp beads integrated at the bottom of the light board, thereby evenly distributing the light from the light board onto the transparent lamp cover.

9. The solar-powered waterproof decorative lamp according to claim 8, wherein a center of the bottom of the transparent lamp cover is provided with a mounting interface for mounting the protective sleeve, and the protective sleeve and the mounting interface are detachably assembled and fixed;

the sensor probe extends from inside the lower shell to the outside through the mounting interface; and a sealing plug wrapping around a wire of the sensor probe is provided inside the mounting interface, providing waterproof closure for the mounting interface without affecting the normal use of the sensor probe.

10. The solar-powered waterproof decorative lamp according to claim 1, wherein an inner side of the sealing ring protrudes upward to form an annular boss, while a bottom of the sealing ring fits against an outer edge of the support plate;

a top of the support plate is provided with an annular slot along the inner side of the sealing ring; and a bottom of the shell cover of the upper shell is correspondingly provided with a wedge slot that matches the boss at a position corresponding to the boss on the sealing ring, and an annular clamping edge engagable with the slot is integrally formed inside the wedge slot.

11. The solar-powered waterproof decorative lamp according to claim 1, wherein both the lower shell and the upper shell have a connection hole at opposite positions at a same side, and a middle section of the protective sleeve adopts a hollow design.

12. A solar-powered waterproof decorative lamp, comprising:

a lower shell;

an upper shell joined with the lower shell;

a sealing ring arranged between the lower shell and the upper shell for sealing the lower shell and the upper shell;

an electronic assembly arranged between the lower shell and upper shell for providing a light source and power supply for the decorative lamp;

wherein the electronic assembly comprises a lithium battery and a light board, with multicolor LED lamp beads integrated at the center of a bottom of the light board; and the light board is further integrated with a light control circuit module for controlling color changes of the LED lamp beads and a charge-discharge control circuit module for controlling charging and discharging of the lithium battery;

a photovoltaic power generation assembly installed on a top of the upper shell for providing solar charging to the electronic assembly;

wherein the lower shell comprises a support plate and a transparent lamp cover, with the support plate configured to be fixed to the upper shell, and the transparent lamp cover positioned at the center of the support plate; and a protective sleeve arranged at a bottom of the transparent lamp cover, with a sensor probe installed inside the protective sleeve;

wherein the transparent lamp cover is designed with an overall hemispherical structure, and an inner sidewall of the transparent lamp cover consists of a plurality of planes forming a polygonal concave structure for repeatedly refracting and scattering the light emitted by the LED lamp beads integrated at the bottom of the light board, thereby evenly distributing the light from the light board onto the transparent lamp cover.

13. The solar-powered waterproof decorative lamp according to claim 12, wherein the electronic assembly further comprises an LED display;

the upper shell comprises a shell cover with a bottom assembled and fixed with the support plate;

a top of the shell cover is provided with a solar panel mounting groove and a display mounting groove for mounting the photovoltaic power generation assembly and the LED display respectively; and the shell cover also houses a battery compartment for securing and mounting the lithium battery; and both the lower shell and upper shell have a connection hole at opposite positions on a same side, and a middle section of the protective sleeve adopts a hollow design.

14. The solar-powered waterproof decorative lamp according to claim 13, wherein the LED display is installed in the display mounting groove and is also electrically connected to the sensor probe and the charge-discharge control circuit module on the light board for displaying a level of the lithium battery and data detected by the sensor probe in real time; and a waterproof plexiglass protective plate is fixed at a top of the display mounting groove with a sealant.

15. The solar-powered waterproof decorative lamp according to claim 12, wherein one side of the shell cover is equipped with a charging port and a light adjustment button, electrically connected to the charge-discharge control circuit module and the light control circuit module integrated on the light board, and a removable waterproof and dustproof silicone cover is provided outside the charging port and the light adjustment button.

16. The solar-powered waterproof decorative lamp according to claim 12, wherein the photovoltaic power generation assembly comprises a plurality of solar photovoltaic panels that are respectively arranged in corresponding solar panel mounting grooves, and the solar photovoltaic panels and the solar panel mounting grooves are secured and waterproof-sealed with a sealant; and the photovoltaic power generation assembly further comprises a junction box electrically connected to all solar photovoltaic panels, and the junction box is installed inside the upper shell and electrically connected to the charge-discharge control circuit module on the light board.

17. The solar-powered waterproof decorative lamp according to claim 12, wherein a center of the bottom of the transparent lamp cover is provided with a mounting interface for mounting the protective sleeve, and the protective sleeve and the mounting interface are detachably assembled and fixed;

the sensor probe extends from inside the lower shell to the outside through the mounting interface;

a sealing plug wrapping around a wire of the sensor probe is provided inside the mounting interface, providing waterproof closure for the mounting interface without affecting the normal use of the sensor probe; and the sensor probe is any one of a thermistor sensor probe, a capacitive humidity sensor, or an infrared temperature sensor.

18. The solar-powered waterproof decorative lamp according to claim 12, wherein an inner side of the sealing ring protrudes upward to form an annular boss, while a bottom of the sealing ring fits against an outer edge of the support plate;

a top of the support plate is provided with an annular slot along the inner side of the sealing ring; and a bottom of the shell cover of the upper shell is correspondingly provided with a wedge slot that matches the boss at a position corresponding to the boss on the sealing ring, and an annular clamping edge engagable with the slot is integrally formed inside the wedge slot.

19. A solar-powered waterproof decorative lamp, comprising:

a shell, comprising a lower shell and an upper shell that are integrally formed;

an electronic assembly arranged between the lower shell and the upper shell for providing a light source and power supply for the decorative lamp;

a photovoltaic power generation assembly installed on a top of the upper shell for providing solar charging to the electronic assembly;

wherein the lower shell comprises a support plate and a transparent lamp cover, the support plate is configured to be assembled and fixed with the upper shell, and the transparent lamp cover is arranged in the middle of the support plate; and a protective sleeve arranged at a bottom of the transparent lamp cover, with a sensor probe installed inside the protective sleeve.

* * * * *